United States Patent
Saijo et al.

(10) Patent No.: US 8,273,262 B2
(45) Date of Patent: Sep. 25, 2012

(54) METHOD FOR ETCHING GLASS SUBSTRATE

(75) Inventors: Yoshitaka Saijo, Tokyo (JP); Yuichi Suzuki, Tokyo (JP); Ryoji Akiyama, Tokyo (JP); Atsuyoshi Takenaka, Tokyo (JP); Junichiro Kase, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 225 days.

(21) Appl. No.: 12/781,884

(22) Filed: May 18, 2010

(65) Prior Publication Data
US 2010/0224589 A1 Sep. 9, 2010

Related U.S. Application Data

(63) Continuation of application No. PCT/JP2008/070813, filed on Nov. 14, 2008.

(30) Foreign Application Priority Data

Nov. 19, 2007 (JP) ................. 2007-299066

(51) Int. Cl.
*C03C 15/00* (2006.01)
(52) U.S. Cl. ............. 216/97; 216/83; 216/104; 438/756
(58) Field of Classification Search .................. 438/745, 438/750, 752, 743, 753; 216/83, 99, 104, 216/97
See application file for complete search history.

(56) References Cited

U.S. PATENT DOCUMENTS

| 7,404,910 | B1* | 7/2008 | Kezuka et al. | 216/103 |
| 2003/0017686 | A1* | 1/2003 | Wada | 438/586 |
| 2006/0249873 | A1* | 11/2006 | Smith et al. | 264/232 |

FOREIGN PATENT DOCUMENTS

| JP | 06-340448 | 12/1994 |
| JP | 2002-237030 | 8/2002 |
| JP | 2003-020255 | 1/2003 |
| JP | 2003-313049 | 11/2003 |

OTHER PUBLICATIONS

Office Action issued Sep. 21, 2011, in Chinese Patent Application No. 200880116763.5 (with English-language translation).
Wu Wen-Qiang, et al. "A New Photoresist for Glass Etching", Chinese Journal of Applied Chemistry, vol. 24, No. 2, Feb. 2007, pp. 134-138 (with English Abstract).

* cited by examiner

*Primary Examiner* — Lan Vinh
(74) *Attorney, Agent, or Firm* — Oblon, Spivak, McClelland, Maier & Neustadt, L.L.P.

(57) ABSTRACT

The invention provides a method for etching which is intended for reducing the thickness of a glass substrate, and which attains a high etching rate and is capable of inhibiting haze generation on the glass substrate surface. The invention relates to a method for etching a glass substrate surface, comprising etching the glass substrate surface in an amount of 1-690 μm in terms of etching amount, in which the etching is conducted with an etchant having an HF concentration of 1-5 wt % and an HCl concentration of 1 wt % or higher.

11 Claims, 1 Drawing Sheet

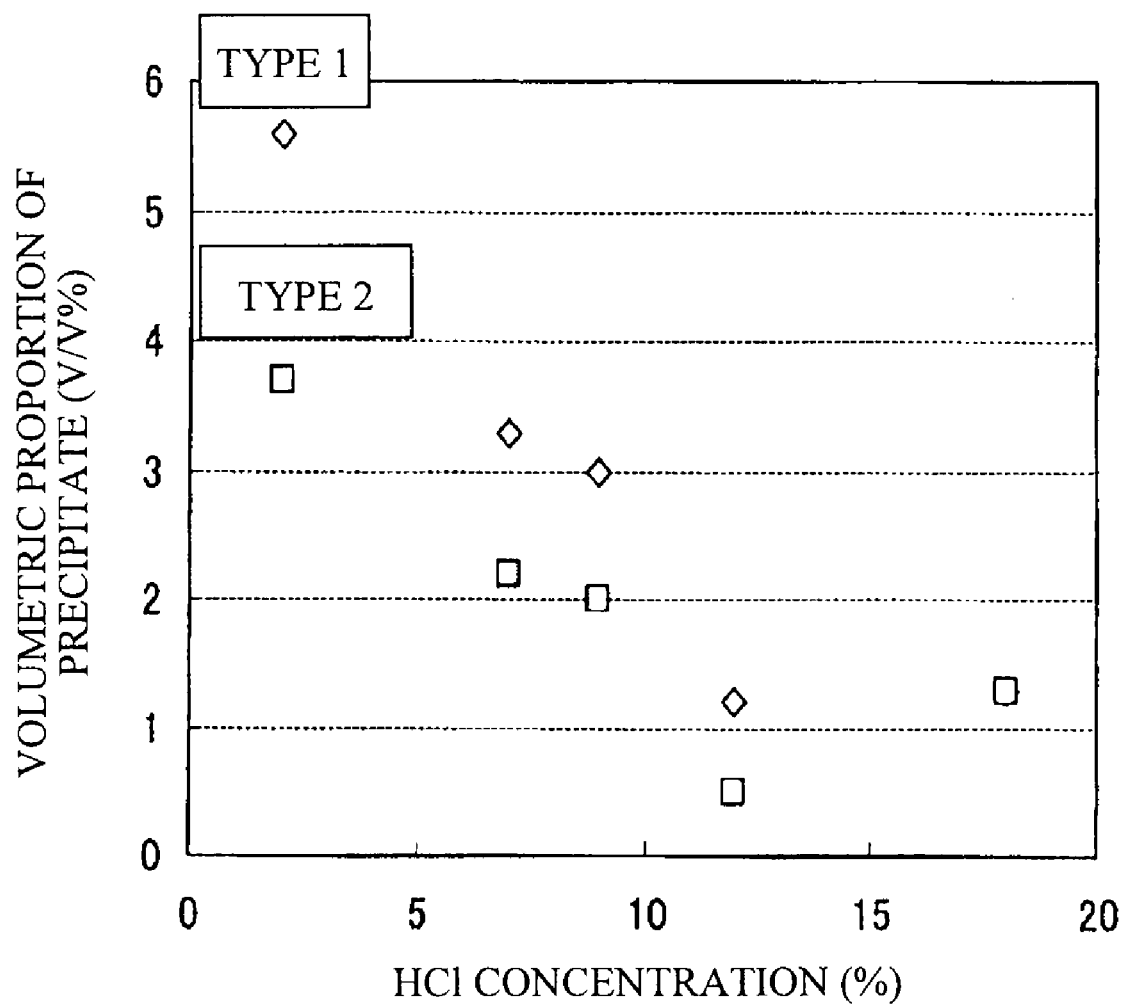

METHOD FOR ETCHING GLASS SUBSTRATE

TECHNICAL FIELD

The present invention relates to a method for etching glass substrates. More particularly, the invention relates to a method for etching the surface of a glass substrate for use in displays, such as liquid-crystal displays (LCDs) or organic EL displays (OELDs), in order to reduce the thickness of the glass substrate.

BACKGROUND ART

In the field of medium- and small-size LCDs and OELDs, in particular, portable displays such as mobile devices, digital cameras, and cell phones, an important task is weight reduction and thickness reduction of the displays. In order to realize a further thickness reduction in glass substrates, there has been extensively employed a step in which the surface of a glass substrate is etched after a step of array color filter lamination to reduce the thickness. For example, there has been employed a treatment of etching the surface of a glass substrate having a thickness of from 0.4 mm to 0.7 mm to obtain a glass substrate having a thickness of from 0.1 mm to 0.4 mm.

As etchant for such etching, etchant containing hydrofluoric acid (HF) is generally used because hydrofluoric acid (HF) is superior in etching function against glasses (see patent document 1).

Etchant containing hydrofluoric acid is used also in etching which is conducted for the purpose of making the surface of a glass substrate for an information-recording medium, such as a hard disk drive, into a desired surface having minute projections (see patent document 2).

In order to enhance an etching rate during etching, it would be satisfied by increasing the concentration of hydrofluoric acid in the etchant. However, in the case of increasing the hydrofluoric acid (HF) concentration of etchant, there has been a problem of haze generation on the glass substrate surface.

Patent document 3 discloses an etching method which inhibits haze generation during etching of a thin film of $SiO_x$, $SiN_x$, or the like formed on a glass substrate with hydrofluoric-acid-containing etchant in the production of displays such as LCDs.

Patent document 3 appears to be an invention relating to a method for etching glass, however, the method disclosed therein is not intended for etching a glass substrate itself but intended for etching $SiO_x$, $SiN_x$, or the like deposited on the surface of a glass substrate. This point is evident from the description in patent document 3 (in particular, the description in paragraph [0002]).

When a thin film of $SiO_x$, $SiN_x$, or the like formed on the surface of a glass substrate is etched, the surface of the glass substrate itself is scarcely etched and the etching amount is 1 µm or smaller at the most.

Generally, for the etching of a glass substrate surface, a glass substrate is immersed in etchant. The higher the hydrofluoric acid (HF) concentration of the etchant or the longer the time period for which the glass substrate is immersed in the etchant, the stronger the tendency that haze generates on the glass substrate surface. In other words, the larger the etching amount of the glass substrate surface, the stronger the tendency that haze generates on the glass substrate surface. From this standpoint, the etching for which the invention described in patent document 3 is intended is directed to conditions which are relatively less apt to cause haze generation on the glass substrate surface.

On the other hand, in the case where etching is conducted for the purpose of reducing the thickness of a glass substrate, the glass substrate is etched in an amount of 1-690 µm (usually 10-650 µm). This etching condition is far more apt to cause haze generation on the glass substrate surface as compared with the etching for which the invention described in patent document 3 is intended.

Consequently, in the case where the etching method described in patent document 3 is applied to etching for the purpose of reducing the thickness of a glass substrate, it is unknown whether the method provides the desired haze-inhibiting effect.

As is apparent from the points described above, there has been no etching method intended for reducing the thickness of a glass substrate and which attains a high etching rate and is capable of inhibiting haze generation on the glass substrate surface.

Patent Document 1: JP-A-2003-313049
Patent Document 2: JP-A-2002-237030
Patent Document 3: JP-A-6-340448

DISCLOSURE OF THE INVENTION

An object of the invention is to provide, in order to eliminate the problem of conventional techniques described above, an etching method intended for reducing the thickness of a glass substrate, and which attains a high etching rate and is capable of inhibiting haze generation on the glass substrate surface.

MEANS FOR SOLVING THE PROBLEM

In order to accomplish the above mentioned object, the present inventors diligently made investigations. As a result, they have found that when etchant containing hydrofluoric acid (HF) and hydrochloric acid (HCl) in a specific proportion is used to etch a glass substrate surface, the glass substrate surface can be etched at a high etching rate without generating haze on the glass substrate surface.

A mixture of hydrofluoric acid (HF) and another acid such as hydrochloric acid has conventionally been used as etchant for the etching of glass substrates. However, it has been utterly unknown that etchant containing hydrofluoric acid (HF) and hydrochloric acid (HCl) in a specific proportion can be used to etch a glass substrate surface at a high etching rate, without generating haze on the glass substrate surface, under conditions where an etching amount is as large as 1-690 µm (usually 10-650 µm) and haze is readily generated on the glass substrate surface, as in etching conducted for the purpose of reducing the thickness of a glass substrate.

Patent document 1, in which etching for reducing the thickness of a glass substrate is described, discloses the use of etchant containing a mixture of hydrofluoric acid and another acid (e.g., hydrochloric acid, sulfuric acid, phosphoric acid). However, it fails to disclose that when etchant containing hydrofluoric acid is used to etch a glass substrate surface, haze generation occurs on the glass substrate surface. The necessity of regulating etchant to have a specific composition in order to inhibit haze generation is not realized at all therein. In addition, since patent document 1 mainly discloses a method for regenerating etchant, it does not disclose the surface properties of etched glass, nor disclose the etching rate during the etching.

On the other hand, patent document 3 discloses an etching method which inhibits haze generation during etching of a thin film of $SiO_x$, $SiN_x$, or the like formed on a glass substrate with etchant containing hydrofluoric acid. However, this etching method is characterized in that the thin film of $SiO_x$, $SiN_x$, or the like formed on a glass substrate is subjected to, prior to the glass is etched, a pre-etching treatment with at least one etchant selected from the group consisting of hydrofluoric-acid-based etchants, inorganic acids, alkalis, and organic acids. In the pre-etching treatment, the glass substrate surface is forced to be etched. However, the etching amount is as small as 1 μm or less at the most, and this is considered to be effective in inhibiting haze generation. In contrast, in the case where a glass substrate surface is etched in an amount as large as 1-690 μm (usually 10-650 μm) as in etching for reducing the thickness of a glass substrate, etching of the glass substrate surface conducted subsequently to the pre-etching exerts a greater influence than the pre-etching. It is therefore considered that the effect of inhibiting haze generation is not obtained with the method disclosed in patent document 3.

Incidentally, patent document 3 fails to disclose that haze generation can be inhibited by regulating etchant so as to have a specific composition.

In the case of patent document 2, the etching is conducted for the purpose of making a glass substrate surface into a desired surface having minute projections. Therefore, haze generation on the glass substrate surface during the etching is not investigated at all.

In order to accomplish the above mentioned object, the present invention provides a method for etching a glass substrate surface (hereinafter referred to as "etching method of the present invention") comprising etching the glass substrate surface in an amount of 1-690 μm in terms of etching amount, wherein the etching is conducted with etchant having an HF concentration of 1-5 wt % and an HCl concentration of 1 wt % or higher.

In the etching method of the present invention, the etchant preferably has an HF concentration of 2-5 wt % and an HCl concentration of 2 wt % or higher.

ADVANTAGES OF THE INVENTION

According to the etching method of the invention, a glass substrate surface can be etched at a high etching rate without generating haze. The etching method of the invention is therefore suitable for etching for the purpose of reducing the thickness of a glass substrate, for example, etching of a glass substrate for use in displays, in particular, etching of a glass substrate for medium- or small-size LCDs or OELDs represented by portable displays, such as mobile devices, digital cameras, and cell phones.

BRIEF DESCRIPTION OF THE DRAWING

FIG. 1 is a graph showing the amount of a precipitate resulting from etching, in which the amount is shown in terms of relationship between the volumetric proportion (V/V %) of a precipitate in etchant (HF, 5 wt %; HCl, 2-18 wt %) and the HCl concentration in the etchant.

BEST MODE FOR CARRYING OUT THE INVENTION

The etching method of the invention is explained below.

The etching method of the invention is a method for etching a glass substrate surface in an amount of 1-690 μm for the purpose of, e.g., reducing the thickness of the glass substrate. It is preferred to use the etching method of the invention for etching a glass substrate surface in an amount of 10-650 μm, and the method is suitable for use in etching a glass substrate surface in an amount of 200-400 μm.

In the etching method of the invention, a mixed acid having an HF concentration of 1-5 wt % and an HCl concentration of 1 wt % or higher is used as etchant to etch a glass substrate surface.

An etching technique selected from a wide rang of known techniques including immersion method, spraying method, showering method, and the like can be used for the method for etching. However, in view of the large etching amount of 1-690 μm and from the standpoint of attaining evenness of etching amount throughout the glass substrate surface, it is preferred to use the immersion method, i.e., a method in which a glass substrate is immersed in etchant. In the case of conducting etching by the immersion method, it is preferred to perform the etching while stirring the etchant from the standpoints of inhibiting haze generation on the glass substrate surface and preventing generation of precipitates in the etchant.

In the etching method of the invention, by using a mixed acid having an HF concentration of 1-5 wt % and an HCl concentration of 1 wt % or higher as etchant, a glass substrate surface can be etched at a high etching rate, i.e., at an etching rate of preferably 0.5 μm/min or higher, more preferably 1.0 μm/min or higher, without generating haze.

In case where the HF concentration is lower than 1 wt %, this results in a reduced etching rate and in a prolonged time period necessary for treating the glass substrate with the etchant in order to attain a desired etching amount. For example, in the case of the immersion method, the period of glass substrate immersion in etchant is prolonged and, hence, haze generation on the glass substrate surface becomes problematic. On the other hand, in case where the HF concentration exceeds 5 wt %, it becomes difficult to treat the acidic discharge gas evolved from the etchant and to treat the waste liquid resulting from the etching.

The HF concentration is more preferably 2-5 wt %, even more preferably 3-5 wt %.

In case where the HCl concentration is lower than 1 wt %, the amount of HCl added to etchant is insufficient and this poses a problem concerning haze generation on the glass substrate surface. In addition, the etching rate is lowered.

The HCl concentration is determined from the standpoint of solubility limit. In the case where HCl is the only acid contained in etchant, the solubility limit is 36 wt %. In the case of a mixed acid containing HCl and HF, the solubility limit varies depending on the concentration of HF. When the HF concentration is 1 wt %, the solubility limit concerning the HCl concentration is theoretically 35 wt %. Consequently, the concentration of HCl is preferably 1-35 wt %. On the other hand, in case where the HCl concentration exceeds 5 wt %, this case also makes it difficult to treat the acidic discharge gas evolved from the etchant and to treat the waste liquid resulting from the etching. Consequently, the HCl concentration is more preferably 2-5 wt %, even more preferably 3-5 wt %.

When etchant containing HF only is used to etch a glass substrate, there are cases where a precipitate generates in a large amount in the etchant, depending on the composition of the glass substrate. This precipitation is considered to be caused by the following mechanism. Aluminum ions ($Al^{3+}$) which have dissolved away from the glass substrate during etching combine with $F^-$ ions present in the etchant to yield $AlF_6^{3-}$ ions, and these ions further combine with metal ions ($Ca^{2+}$, $Mg^{2+}$, $Sr^{2+}$) which have dissolved away from the glass substrate to yield an insoluble or sparingly soluble salt ($M_3[AlF_6]_2$; M is $Ca^{2+}$, $Mg^{2+}$, or $Sr^{2+}$).

Of such insoluble or sparingly soluble salts ($M_3[AlF_6]_2$), $Sr_3[AlF_6]_2$ may be problematic in repeated use of the etchant because this salt is less apt to be sedimented and is present in the state of suspending in the etchant.

The $AlF_6^{3-}$ ions, which are causative of the insoluble or sparingly soluble salt ($M_3[AlF_6]_2$), are apt to generate under acidic conditions of a pH of 1-6. Etchant containing HF only has been regulated so that the upper limit of HF concentration is 5 wt %, for reasons of the treatment of an acidic discharge gas evolved and the treatment of a waste liquid resulting from etching. Because of this, such etchant is under acidic conditions of a pH of 1-3, and $AlF_6^{3-}$ ions are apt to generate. As a result, generation of the insoluble or sparingly soluble salt ($M_3[AlF_6]_2$) is enhanced and the amount of a precipitate in the etchant increases.

On the other hand, in the etching method of the invention, since a mixed acid having an HF concentration of 1-5 wt % and an HCl concentration of 1 wt % or higher is used as etchant, the system is under strongly acidic conditions in which the etchant has a pH of from −1 to 1, and $AlF_6^{3-}$ ions are less apt to generate. As a result, generation of the insoluble or sparingly soluble salt ($M_3[AlF_6]_2$) is diminished, and a considerable decrease in the amount of a precipitate generating during etching is attained. This is a preferred property from the standpoint of repeatedly using the etchant.

The glass substrate to be etched by the etching method of the invention is not particularly limited, and the method is applicable to glasses having a wide range of compositions. Of these, glass substrates containing $Ca^{2+}$, $Mg^{2+}$, or $Sr^{2+}$, in particular, glass substrates containing $Sr^{2+}$, are suitable also from the standpoint of diminishing the generation of a precipitate during etching. Incidentally, $Al^{3+}$ is a component which is usually contained in glass compositions.

The etching method of the invention is suitable for the etching of alkali-free glass having the following composition (1), in which the content of each component is given in terms of mass percentage of oxides.

Composition (1)

Alkali-free glass (100% by mass) containing 50-66% by mass $SiO_2$, 10.5-22% by mass $Al_2O_3$, 5-12% by mass $B_2O_3$, 0-8% by mass MgO, 0-14.5% by mass CaO, 0-24% by mass SrO, and 0-13.5% by mass BaO, MgO+CaO+SrO+BaO being 9-29.5% by mass.

The etching method of the invention is especially suitable for the etching of alkali-free glasses having the following compositions (2) and (3), in which the content of each component is given in terms of mass percentage of oxides.

Composition (2)

Alkali-free glass (100% by mass) containing 57-66% by mass $SiO_2$, 15-22% by mass $Al_2O_3$, 5-12% by mass $B_2O_3$, 0-8% by mass MgO, 0-9% by mass CaO, 0-12.5% by mass SrO, and 0-2% by mass BaO, MgO+CaO+SrO+BaO being 9-18% by mass.

Composition (3)

Alkali-free glass (100% by mass) containing 50-62.5% by mass $SiO_2$, 10.5-18% by mass $Al_2O_3$, 7-11% by mass $B_2O_3$, 0.5-5% by mass MgO, 0-14.5% by mass CaO, 0-24% by mass SrO, and 0-13.5% by mass BaO, MgO+CaO+SrO+BaO being 14-29.5% by mass.

The etching method of the invention is suitable for etching glass substrates for use in displays, in particular, glass substrates for medium- or small-size LCDs represented by portable displays, such as mobile devices, digital cameras, and cell phones; glass substrates for OELDs; and glass substrates for use in LCDs for notebook PCs, for the purpose of reducing the thicknesses thereof. However, applications of the etching method should not be limited to these examples, and the method can be advantageously used for the purpose of reducing the thicknesses of glass substrates for other applications. For example, the etching method can be advantageously used as etching intended for reducing the thickness of glass substrates for large-size LCDs for use in monitors or TVs, glass substrates for large-size OELDs, or glass substrates for PDPs.

EXAMPLES

The invention will be explained below in more detail by reference to Example.

In Example, two types of glass substrates having the compositions shown in Table 1 given below were immersed in etchants having the compositions shown in Tables 2 to 5 given below to etch the glass substrate surfaces. The rate of this etching (μm/min) and the haze of a glass substrate surface which had undergone the etching were determined in the following manners. The results thereof are shown in Tables 2 to 5. When a glass substrate surface had a value of haze of 1 or lower, this means that substantially no haze had generated.

Etching Rate: In a thermostatic chamber kept at 25° C., glass substrates having dimensions of 4×4 cm were immersed, using a jig, in etchants having the compositions shown in the following Tables 2 to 5. The glass substrates were suitably taken out, washed, and then examined for mass. An etching amount was estimated from the difference in mass, area, and specific gravity of each glass substrate. This operation was repeated to determine a relationship between etching time and etching amount, and the inclination of an approximate straight line was taken as an etching rate. The etchants were suitably replaced.

Haze: Glass substrates having dimensions of 2×2 cm were immersed, using a jig, in etchants having the compositions shown in the following Tables 2 to 5. The surfaces of each glass substrate were etched for a period which resulted in an etching amount of the glass substrate of 300 μm, the period having been determined from the etching rate obtained by the method shown above. The etchants were suitably replaced. The glass substrates were washed and then examined for haze with a touch panel type haze computer manufactured by Suga Test Instruments Co., Ltd.

TABLE 1

| Composition (% by mass) | Type 1 | Type 2 |
|---|---|---|
| $SiO_2$ | 59 | 60 |
| $Al_2O_3$ | 18 | 17 |
| $B_2O_3$ | 8 | 8 |
| MgO | 3 | 5 |
| CaO | 4 | 6 |
| SrO | 8 | 4 |
| BaO | 0 | 0 |
| [Remarks] Sum of MgO, CaO, SrO, and BaO | 15 | 15 |

TABLE 2

| | | Type 1 | | | |
|---|---|---|---|---|---|
| | | HCl (wt %) | | | |
| Haze | | 0 | 2 | 5 | 9 |
| HF (wt %) | 2 | | <0.5 | | |
| | 3 | 4.4 | 0.6 | <0.5 | <0.5 |
| | 5 | 1.1 | <0.5 | <0.5 | <0.5 |

TABLE 3

| | Type 1 | | | |
|---|---|---|---|---|
| Etching rate | HCl (wt %) | | | |
| (μm/min) | 0 | 2 | 5 | 9 |
| HF (wt %) 3 | 0.4 | 0.57 | 0.73 | 0.83 |
| 5 | 0.85 | 0.91 | 1.2 | 1.6 |

TABLE 4

| | Type 2 | | | |
|---|---|---|---|---|
| | HCl (wt %) | | | |
| Haze | 0 | 2 | 5 | 9 |
| HF (wt %) 2 | | <0.5 | | |
| 3 | 4.2 | 0.6 | 0.6 | 0.6 |
| 5 | 1.6 | 0.5 | 0.6 | <0.5 |

TABLE 5

| | Type 2 | | | |
|---|---|---|---|---|
| Etching rate | HCl (wt %) | | | |
| (μm/min) | 0 | 2 | 5 | 9 |
| HF (wt %) 3 | 0.36 | 0.52 | 0.72 | 0.79 |
| 5 | 0.82 | 0.92 | 1.1 | 1.5 |

As apparent from Table 2 to Table 5, when the etchants having an HF concentration of 1-5 wt % and an HCl concentration of 1 wt % or higher were used to etch glass substrate surfaces, the glass substrate surfaces were able to be etched at an etching rate as high as not lower than 0.5 μm/min without generating haze. On the other hand, when the etchants having an HF concentration of 1-5 wt % and an HCl concentration lower than 1 wt % were used to etch glass substrate surfaces, the etching rates were low and haze was generated on the glass substrate surfaces.

Furthermore, the etchants shown in the following Table 6 were used to etch glass substrates. The amount of a precipitate after the etching was determined in terms of volumetric proportion to the etchant (V/V %). The results thereof are shown in Table 6 and FIG. 1. The volumetric proportion of the precipitate is preferably 8% or lower, more preferably 2% or lower, from the standpoint of the life of the etchant.

TABLE 6

| Volumetric proportion of precipitates to etchant (HF, 5 wt %; HCl, 2-18 wt %) (V/V %) | | |
|---|---|---|
| HCl (wt %) | Type 1 | Type 2 |
| 2 | 5.6 | 3.7 |
| 7 | 3.3 | 2.2 |
| 9 | 3 | 2 |
| 12 | 1.2 | 0.5 |
| 18 | 1.3 | 1.3 |

As apparent from Table 6 and FIG. 1, it was able to be ascertained that precipitate amount decreases with increasing the HCl concentration in the etchant. Although the results of etching with etchant having an HCl concentration of 0 wt % are not shown, it is apparent from FIG. 1 that etching with such etchant results in a further increase in precipitate amount as compared with the case of etching with the etchant having an HCl concentration of 2 wt %.

While the invention has been described in detail and with reference to specific embodiments thereof, it will be apparent to one skilled in the art that various changes and modifications can be made therein without departing from the spirit and scope thereof.

This application is based on Japanese Patent Application No. 2007-299066, which was filed on Nov. 19, 2007, the contents thereof being herein incorporated by reference.

The invention claimed is:

1. A method for etching a glass substrate surface, comprising:
   etching a surface of a glass substrate in an etching amount of 1-690 μm,
   wherein the etching comprises applying an etchant having an HF concentration of 1-5 wt % and an HCl concentration of 1 wt % or higher, the glass substrate comprises 50 to 66% by mass of $SiO_2$, 10.5 to 22% by mass of $Al_2O_3$, 5 to 12% by mass of $B_2O_3$, 0 to 8% by mass of MgO, 0 to 14.5% by mass of CaO, 0 to 24% by mass of SrO, and 0 to 13.5% by mass of BaO, and a sum of MgO, CaO, SrO and BaO in the glass substrate is 9 to 29.5% by mass.

2. The method for etching a glass substrate surface according to claim 1, wherein the etchant has an HF concentration of 2-5 wt % and an HCl concentration of 2 wt % or higher.

3. The method for etching a glass substrate surface according to claim 1, wherein the etching is performed at an etching rate of 0.5 μm/min or higher.

4. The method for etching a glass substrate surface according to claim 1, wherein the etchant has an HCl concentration of 9 wt % or more.

5. The method for etching a glass substrate surface according to claim 1, wherein the surface of the glass substrate is etched in an etching amount of 10-650 μm.

6. The method for etching a glass substrate surface according to claim 1, wherein the surface of the glass substrate is etched in an etching amount of 200-400 μm.

7. The method for etching a glass substrate surface according to claim 1, wherein the etching is performed at an etching rate of 1.0 μm/min or higher.

8. The method for etching a glass substrate surface according to claim 1, wherein the etchant has an HF concentration of 3-5 wt %.

9. The method for etching a glass substrate surface according to claim 1, wherein the etchant has an HCl concentration of 9-18 wt %.

10. The method for etching a glass substrate surface according to claim 1, wherein the etching comprises immersing the glass substrate in the etchant.

11. The method for etching a glass substrate surface according to claim 1, wherein the etching comprises immersing the glass substrate in the etchant while stirring the etchant.

* * * * *